US010038288B2

(12) United States Patent
Choi et al.

(10) Patent No.: US 10,038,288 B2
(45) Date of Patent: Jul. 31, 2018

(54) ADAPTER FOR A MOBILE DEVICE

(71) Applicant: SYMBOL TECHNOLOGIES, LLC, Lincolnshire, IL (US)

(72) Inventors: JaeHo Choi, Whitestone, NY (US); Travis Baldwin, Medford, NY (US); Mu-Kai Shen, Taipei (TW); Edward M. Voli, East Setauket, NY (US)

(73) Assignee: SYMBOL TECHNOLOGIES, LLC, Holtsville, NY (US)

( * ) Notice: Subject to any disclaimer, the term of this patent is extended or adjusted under 35 U.S.C. 154(b) by 0 days.

(21) Appl. No.: 15/446,436

(22) Filed: Mar. 1, 2017

(65) Prior Publication Data

US 2018/0115128 A1 Apr. 26, 2018

Related U.S. Application Data

(60) Provisional application No. 62/410,735, filed on Oct. 20, 2016.

(51) Int. Cl.
*H01R 31/00* (2006.01)
*H01R 31/06* (2006.01)
*H01R 13/22* (2006.01)

(52) U.S. Cl.
CPC ............. *H01R 31/06* (2013.01); *H01R 13/22* (2013.01)

(58) Field of Classification Search
CPC ................................ H01R 31/06; H01R 13/22
USPC ......................................................... 439/653
See application file for complete search history.

(56) References Cited

U.S. PATENT DOCUMENTS

| 4,248,494 | A | * | 2/1981 | McDonald | ............. | H01R 31/02 |
| | | | | | | 439/638 |
| 4,740,172 | A | * | 4/1988 | Tubbs | .................. | H01R 24/542 |
| | | | | | | 439/344 |
| 4,861,283 | A | * | 8/1989 | Beaulieu | ................ | H04Q 1/141 |
| | | | | | | 439/372 |

(Continued)

FOREIGN PATENT DOCUMENTS

| EP | 1455529 A1 | 9/2004 |
| EP | 2141566 A2 | 1/2010 |
| EP | 2385592 A1 | 11/2011 |

OTHER PUBLICATIONS

International Search Report and Written Opinion for International Application No. PCT/US2011/052929 dated Nov. 11, 2011.

(Continued)

*Primary Examiner* — Abdullah Riyami
*Assistant Examiner* — Vladimir Imas

(57) ABSTRACT

An adapter for a mobile device is provided. The adapter comprises a plug including an outer surface and an inner surface, the inner surface opposite the outer surface. The adapter further comprises a surface mount connection port located at the outer surface. The adapter further comprises a male connector extending from the inner surface. The adapter further comprises one or more electrical connections between the male connector and the surface mount connection port. The plug is configured to mate with a socket of a device, and the male connector is configured to mate with a respective female connection port of the device located within the socket, the outer surface of the plug being flush with a respective outer surface of the device when the plug is mated with the socket.

19 Claims, 13 Drawing Sheets

(56) References Cited

U.S. PATENT DOCUMENTS

| | | | | |
|---|---|---|---|---|
| 5,354,204 A * | 10/1994 | Hughes | B60D 1/64 | 439/35 |
| 5,456,620 A * | 10/1995 | Kaminski | H01R 33/09 | 439/619 |
| 5,766,020 A * | 6/1998 | Hughes | B60D 1/64 | 439/35 |
| 5,800,218 A * | 9/1998 | Abucewicz | H01R 31/06 | 439/76.1 |
| 5,857,866 A * | 1/1999 | Felps | H01R 13/08 | 439/289 |
| 6,390,824 B1 * | 5/2002 | Vance | H01R 13/5213 | 439/218 |
| 6,431,880 B1 * | 8/2002 | Davis | H01R 9/2491 | 439/76.2 |
| 6,616,487 B1 * | 9/2003 | Lai | H01R 24/58 | 439/606 |
| 6,719,590 B1 * | 4/2004 | Wu | H01R 31/06 | 439/638 |
| 6,719,591 B1 * | 4/2004 | Chang | H01R 27/02 | 439/638 |
| 6,824,406 B1 * | 11/2004 | Sharples | H01R 13/62977 | 439/157 |
| 6,830,483 B1 * | 12/2004 | Wu | H01R 31/06 | 439/638 |
| 7,094,099 B2 * | 8/2006 | Daggett | H01R 13/6273 | 439/544 |
| 7,121,850 B2 * | 10/2006 | Yeh | H01R 31/06 | 439/131 |
| 7,445,513 B1 * | 11/2008 | Lee | H01R 31/06 | 439/131 |
| 7,717,739 B2 * | 5/2010 | Hawkins | H01R 31/06 | 439/503 |
| 7,722,369 B2 * | 5/2010 | Bushby | H01R 13/6397 | 439/134 |
| 7,789,704 B2 * | 9/2010 | Ho | H01R 31/06 | 439/606 |
| 7,874,844 B1 * | 1/2011 | Fitts, Jr. | H01R 31/06 | 439/218 |
| 7,909,651 B2 * | 3/2011 | Kim | H01R 24/58 | 439/638 |
| 7,980,088 B2 * | 7/2011 | LeClear | H01R 31/06 | 62/331 |
| 8,535,102 B1 * | 9/2013 | Colahan | H01R 31/06 | 439/5 |
| 8,618,416 B2 * | 12/2013 | Rothbaurer | H01R 13/5213 | 174/66 |
| 8,721,371 B2 * | 5/2014 | Picker | H01R 13/58 | 429/468 |
| 9,312,651 B2 * | 4/2016 | Hsiang | H01R 24/62 | |
| 9,356,370 B2 * | 5/2016 | Lee | H01R 12/71 | |
| 9,455,528 B1 * | 9/2016 | Chao | H01R 13/64 | |
| 9,529,387 B2 * | 12/2016 | Carnevali | G06F 1/1628 | |
| 9,557,716 B1 * | 1/2017 | Inamdar | G04G 17/06 | |
| 9,602,639 B2 * | 3/2017 | Carnevali | H04M 1/0254 | |
| 9,706,026 B2 * | 7/2017 | Carnevali | G06F 1/1628 | |
| 2007/0167197 A1 | 7/2007 | Fuke et al. | | |
| 2009/0153438 A1 | 6/2009 | Miller et al. | | |
| 2009/0295753 A1 | 12/2009 | King et al. | | |
| 2009/0323262 A1 | 12/2009 | Arita | | |
| 2010/0026656 A1 | 2/2010 | Hotelling et al. | | |
| 2010/0029339 A1 | 2/2010 | Kim et al. | | |
| 2012/0009896 A1 | 1/2012 | Bandyopadhyay et al. | | |
| 2012/0075233 A1 | 3/2012 | Lakshminarayanan et al. | | |
| 2016/0211609 A1 | 7/2016 | Sorias | | |

OTHER PUBLICATIONS

International Search Report and Written Opinion for International Patent Application No. PCT/US2017/020121 dated Jul. 11, 2017.
International Search Report and Written Opinion for International Patent Application No. PCT/US2016/062002 dated Jun. 21, 2017.

* cited by examiner

ADAPTER FOR A MOBILE DEVICE

CROSS-REFERENCE TO RELATED APPLICATIONS

The present application claims priority from U.S. Provisional Application No. 62/410,735 filed Oct. 20, 2016, the entire content of which is incorporated herein by reference.

BACKGROUND

Enterprise-grade devices are often equipped with surface mount charging pads compatible with surface mount charging stations. Such devices are challenging to charge outside of the enterprise environment as surface mount charging stations are expensive and unlikely to be deployed in a consumer environment (e.g. a person's home). Hence, when a user, such as an enterprise employee, takes such a device home (e.g. overnight), it is likely the user will not have a compatible charger and the device may not get charged. Furthermore, consumer-grade devices are generally equipped with female connection ports compatible with consumer-grade charging schemes and/or charging stations that include male connectors. Such male connectors are prone to damage in enterprise environments due to torquing that can occur when connecting or disconnecting a device with the male connector.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Figure 1:
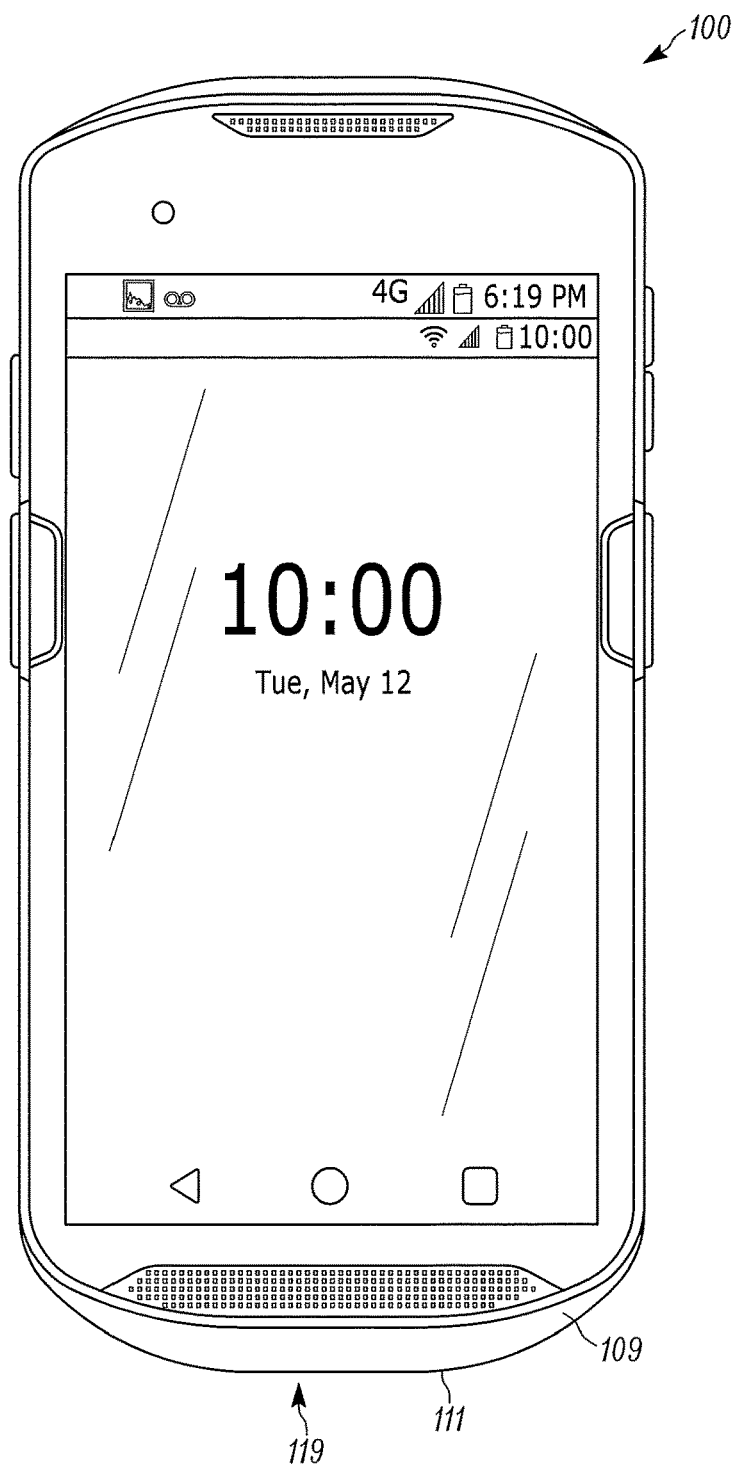
FIG. 1 depicts a front perspective view of a device that includes a socket for adapting the functionality of the mobile device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

Implementations of the present disclosure describe a mobile device and/or a mobile computing device and/or a mobile computer that includes a housing with a socket for receiving one or more accessories. The socket is disposed in an outer surface of the mobile device housing, the socket having an inner surface inset from the outer surface of the housing. A female connection port is located at the inner surface of the socket. The one or more accessories include an adapter that converts the female connection port to a surface mount connector port, for example to adapt the mobile device for use with enterprise-grade charging stations. The adapter comprises a plug having an outer surface and an inner surface, the inner surface of the plug being opposite the outer surface of the plug. The adapter further includes a male connector extending from the inner surface of the plug and a surface mount connection port located at the outer surface of the plug. The male connector is configured to mate with a respective female connection port of the device located within the socket, the outer surface of the plug being flush with a respective outer surface of the mobile device housing when the plug is mated with the socket.

An aspect of the present specification provides an adapter comprising: a plug including an outer surface and an inner surface, the inner surface opposite the outer surface; a surface mount connection port located at the outer surface; a male connector extending from the inner surface; and, one or more electrical connections between the male connector and the surface mount connection port, the plug configured to mate with a socket of a device, and the male connector configured to mate with a respective female connection port of the device located within the socket, the outer surface of the plug being flush with a respective outer surface of the device when the plug is mated with the socket.

In some implementations, the plug includes a sealing portion around the male connector, the sealing portion configured to mate with a cavity located around the respective female connection port of the device.

In some implementations, the plug includes a soft rubber seal element and a hard rubber encasement, the soft rubber seal element configured to seal the male connector against the hard rubber encasement.

In some implementations, the adapter further comprises a tether extending from the inner surface, adjacent the male connector.

In some implementations, the male connector includes one or more of a universal serial bus (USB) connector, a USB-C connector, and a LIGHTNING connector.

In some implementations, the surface mount connection port includes a POGO contact pad.

In some implementations, the surface mount connection port includes: a POGO contact pad; and a connector cover having a first plurality of cutouts above the POGO contact pad.

In some implementations, the surface mount connection port comprises one or more cutouts configured to receive one or more guideposts of an external accessory when mating the surface mount connection port with the external accessory.

In some implementations, the one or more electrical connections include a printed circuit board located in the plug.

Another aspect of the present specification provides a device comprising: a housing including an outer surface; a socket disposed in the outer surface of the housing, the socket including an inner surface inset from the outer surface; and, a female connection port located at the inner surface of the socket, the socket and the female connection port configured to receive an adapter that comprises a plug, configured to mate with the socket, the adapter further comprising a male connector, configured to mate with the female connection port, the socket configured to receive a respective inner surface of the plug against the inner surface of the socket.

In some implementations, the adapter converts the female connection port to a surface mount connection port, a respective outer surface of the adapter being flush with the outer surface of the housing when the adapter is mated with the socket.

In some implementations, the socket further includes a cavity at the inner surface, located around the female connection port, the cavity configured to mate with a sealing portion of the adapter.

In some implementations, the socket further includes an aperture configured to removably receive a tether attached to the adapter.

In some implementations, the female connection port includes one of a universal serial bus port and a LIGHT-NING port.

In some implementations, the socket is further configured to mate with a cover that seals the socket and the female connection port.

In some implementations, the socket includes one or more sidewalls extending between the outer surface of the housing and the inner surface of the socket.

Another aspect of the present specification provides a connector assembly comprising: a socket disposed in an outer surface of a housing, the socket including an inner surface inset from the outer surface of the housing; and a female connection port located at the inner surface of the socket, the socket and the female connection port configured to receive an adapter comprising a plug that converts the female connection port to a surface mount connection port, a respective outer surface of the plug being flush with the outer surface of the housing when the plug is mated with the socket. In some implementations, the adapter further comprises a male connector configured to mate with the female connection port, the socket configured to receive a respective inner surface of the plug against the inner surface of the socket; in some of these implementations, the plug includes a soft rubber seal element and a hard rubber encasement, the soft rubber seal element configured to seal the male connector against the hard rubber encasement. In some implementations, the socket further includes an aperture configured to removably receive a tether attached to the adapter.

Figure 2:
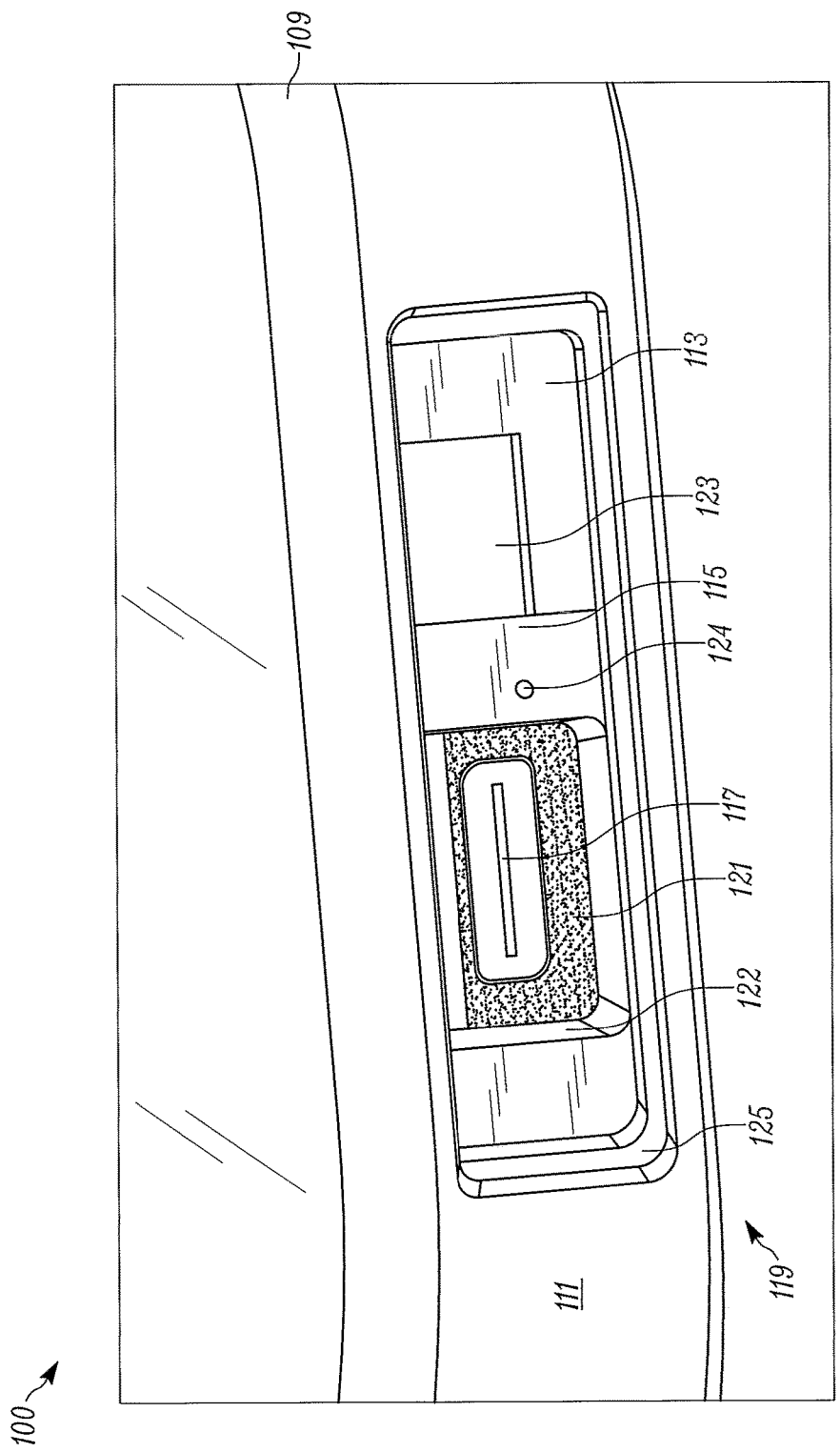
FIG. 2 depicts an end view of the device of FIG. 1.

Attention is directed to FIG. 1 and FIG. 2 which respectively depict: a front perspective view of a mobile device 100 (interchangeably referred to hereafter as the device 100), and an end view of the device 100. The device 100 comprises a housing 109 including an outer surface 111; a socket 113 (as best seen in FIG. 2) disposed in the outer surface 111 of the housing 109, the socket 113 including an inner surface 115 inset from the outer surface 111; and, a female connection port 117 located at the inner surface 115 of the socket 113, the socket 113 and the female connection port 117 configured to receive an adapter that comprises a plug, configured to mate with the socket 113, the adapter further comprising a male connector, configured to mate with the female connection port 117, the socket 113 configured to receive a respective inner surface of the plug against the inner surface 115 of the socket 113, as described in more detail below with respect to FIG. 9.

Device 100 generally comprises a mobile device which may include, but is not limited to, any suitable combination of electronic devices, communications devices, computing devices, portable electronic devices, mobile computing devices, portable computing devices, tablet computing devices, telephones, PDAs (personal digital assistants), cellphones, smartphones, e-readers, mobile camera devices and the like, each of which comprises a data capture component. Other suitable devices are within the scope of present implementations. For example, device 100 need not comprise a mobile communication device, but rather may comprise a device with specialized functions, for example a device having warehouse inventory tracking and/or other data acquisition functionality, such as a mobile scanner having one or more of a radio frequency identification (RFID) reader, Near Field Communication (NFC) reader, imager, and/or laser-based scanner data acquisition components. In some implementations, data capture component may comprise a camera used to capture images for warehousing functionality. In yet further implementations, device 100 may be mountable in a vehicle.

However, as depicted device 100 comprises a mobile device, configured for data and/or telephony functionality, and optionally for warehousing functionality. However, other devices are within the scope of present implementations.

As depicted, the socket 113 is located at an end 119 of the device 100, the end 119 located along a lateral axis of the device 100, for example at a bottom end of the device 100, though it is understood that the term "bottom" is relative to the device 100 and the device 100 can be placed in any orientation. In other implementations, the socket 113 is located along a side of the device 100 and/or at a front of the device 100 and/or at a rear of the device 100 and/or at a top end of the device 100. Indeed, the socket 113 is generally located at any suitable position in the housing 109, for example compatible with a location of display of the device 100 and/or compatible with locations of internal components of the device 100 that are electrically connected to the female connection port 117.

As depicted, the socket 113 further includes a cavity 121 at the inner surface 115, located around the female connection port 117, the cavity 121 configured to mate with a sealing portion of the adapter, as described in more detail below. Furthermore, as depicted, at least a portion of the inner surface 115 includes a recess 122 around the cavity 121 having a shape similar to a complementary sealing portion of an adapter, as described in more detail below with respect to FIG. 8 and FIG. 9.

As depicted, at least a portion of the inner surface 115 is further defined by a slot 123 having a shape complementary to a further portion of an adapter, as described in more detail below with respect to FIG. 8 and FIG. 9.

Indeed, the inner surface 115 is generally adapted to receive and/or mate with a respective inner surface of an adapter used with the socket 113.

As depicted, the socket 113 further includes an aperture 124 configured to removably receive a tether attached to the adapter, as described in more detail below, as described in more detail below with respect to FIG. 11.

As depicted, the socket 113 further includes one or more sidewalls 125 extending between the outer surface 111 of the housing 109 and the inner surface 115 of the socket 113. Indeed, as depicted, the one or more sidewalls 125 define the depth of a generally rectangular shape of the socket 113, having rounded corners. Furthermore, the one or more sidewalls 125 further define the depth of each of the cavity 121, the recess 122, the slot 123.

Put another way, the socket 113 extends into the device 100 to different depths defined by the one or more sidewalls 125, and furthermore the female connection port 117 is inset into the device to a depth define by the one or more sidewalls 125, including sidewalls of the recess 122.

In some implementations, the female connection port 117 includes one or more of a Universal Serial Bus (USB) port, a USB-C port, and the like configured to mate with a complementary USB connector and/or a complementary USB-C connector. In other implementations, the female connection port 117 includes a LIGHTNING™ port configured to mate with a complementary LIGHTNING™ connector. Indeed, the female connection port 117 comprises any female connection port configured to mate with a complementary male connector.

The female connection port 117 is generally configured to charge a battery (not depicted) of the device 100, when a male connector of a charging accessory is mated with the female connection port 117. Hence, while not depicted, in some implementations, the female connection port 117 is in communication with a charging circuit of the device 100. In yet further implementations, the female connection port 117 is in communication with a processor (not depicted) of the device 100 and/or a communication interface (not depicted) of the device 100. Regardless, the female connection port 117 is useable to one or more of charge the device 100 and communicate with the device 100, when a male connector of an accessory is mated with the female connection port 117. Hence, the female connection port 117 is useable to expand the functionality of the device 100, such functionality being generally dependent on the functionality of the adapter with which the female connection port 117 is mated.

Similarly, the socket 113 is generally useable to expand the functionality of the device 100, such functionality being generally dependent on the functionality of the adapter with which the socket 113 is mated. Furthermore, the socket 113 is generally useable to adapt a shape and/or physical configuration of the device 100 and/or the housing 109, depending on the shape of the adapter with which the socket 113 is mated.

Figure 3:
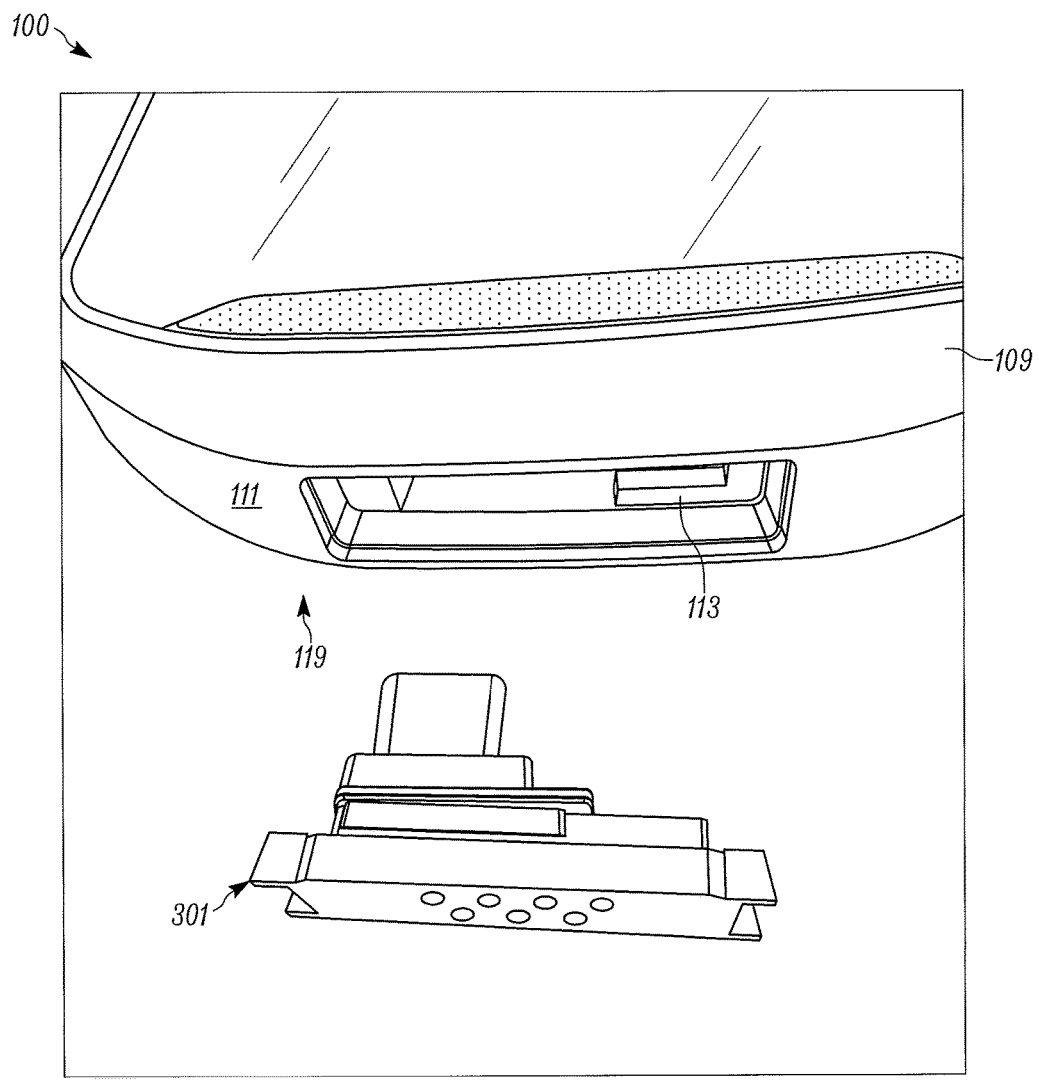
FIG. 3 depicts a perspective end view of the device of FIG. 1, and an adapter mateable with the socket.

For example, attention is next directed to FIG. 3 which depicts the end 119 of the device 100, including the socket 113 disposed in the outer surface 111 of the housing 109, receiving an adapter 301 that converts the female connection port 117 (not depicted in FIG. 3) to a surface mount connection port.

Figure 4:
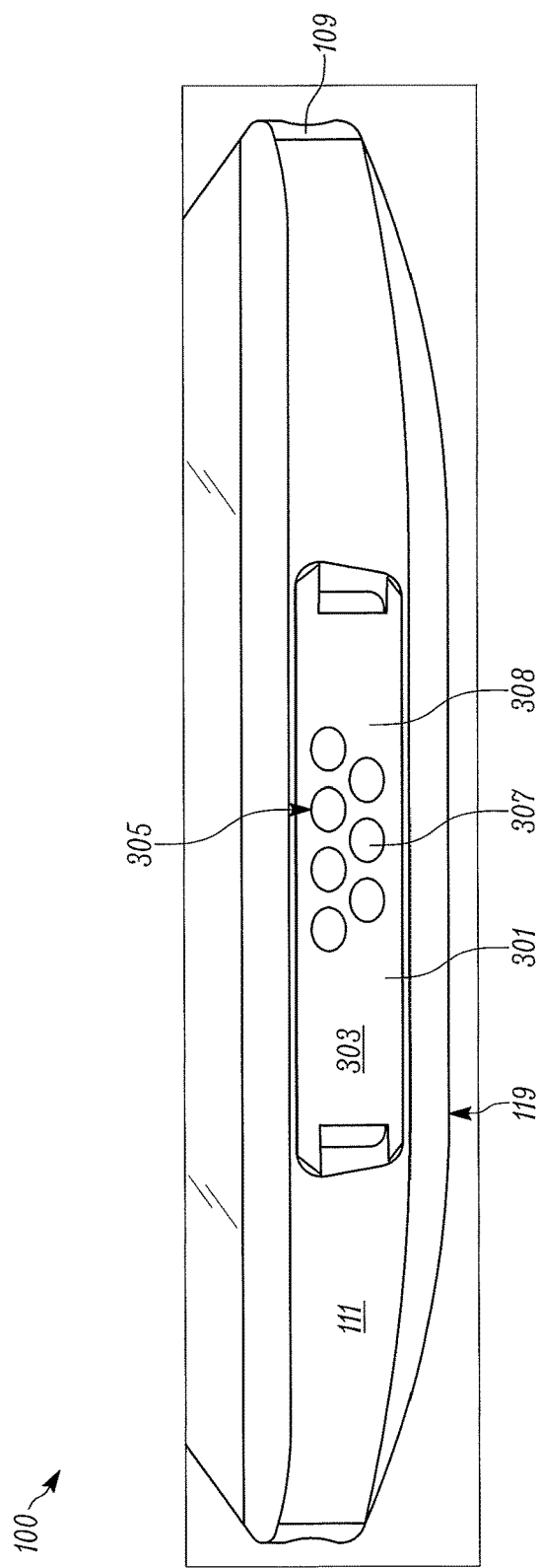
FIG. 4 depicts an end view of the mobile device of FIG. 1, with an adapter mated with the socket.

Attention is also directed to FIG. 4 which depicts the adapter 301 received in the socket 113. As depicted, a respective outer surface 303 of the adapter 301 is flush with the outer surface 111 of the housing 109 when the adapter 301 is mated with the socket 113. Hence, the adapter 301 adapts and/or converts a shape and/or physical configuration of the device 100 by "filling in" the socket 113, for example for compatibility with a surface mount charging station. Alternatively, the adapter 301 adapts and/or converts a shape and/or physical configuration of the device 100 for compatibility with a surface mount charging station.

A surface mount connection port 305 is located at the outer surface 303 of the adapter 301, the surface mount connection port 305 including one or more contact pads 307 and/or surface electrodes, that are hence also about flush with the outer surface 111 of the housing 109. As depicted, the surface mount connection port 305 includes: a POGO contact pad; and a connector cover 308 having a first plurality of cutouts above the POGO contact pad which define apertures for accessing the one or more contact pads 307, each of which comprise a respective POGO electrode.

In some implementations, the one or more contact pads 307 are gold plated to improve electrical contact between the one or more contact pads 307 and complementary pins of a surface mount charging station.

As will be described below, the surface mount connection port 305 is in electrical communication with a male connector of the adapter 301 which mates with the female connection port 117 of the device 100. As such, when the adapter 301 is mated with the socket 113, the device 100 is adapted to be chargeable using a surface mount charging station, with one or more respective pins of the surface mount charging station in contact with the one or more surface contact pads 307 when the device 100 is received at the surface mount charging station.

Hence, the device 100 is chargeable using either a male connector based charging accessory, which is common in consumer-grade environments, and chargeable using a surface mount charging station (and/or surface mount charging accessory), which is common in enterprise-grade environments. As such, a user of the device 100, such as an enterprise employee, can retrieve the device 100 from a surface mount charging station, take the device 100 home overnight and charge the device 100 at home using a male connector based charging accessory by removing the adapter 301.

Hence, the adapter 301 adapts and/or converts both the functionality of the device 100 for use with a surface mount charging station, and further adapts and/or converts shape and/or physical configuration of the device 100 by "filling in" the socket 113, for example for compatibility with a surface mount charging station. Alternatively, the adapter 301 adapts and/or converts a shape and/or physical configuration of the device 100 for compatibility with a surface mount charging station.

As depicted, the outer surface 303 of the adapter 301 is textured, and further is colored, for example to match a color of the device 100, however, the adapter 301 can be any suitable color and/or texture.

Figure 5:
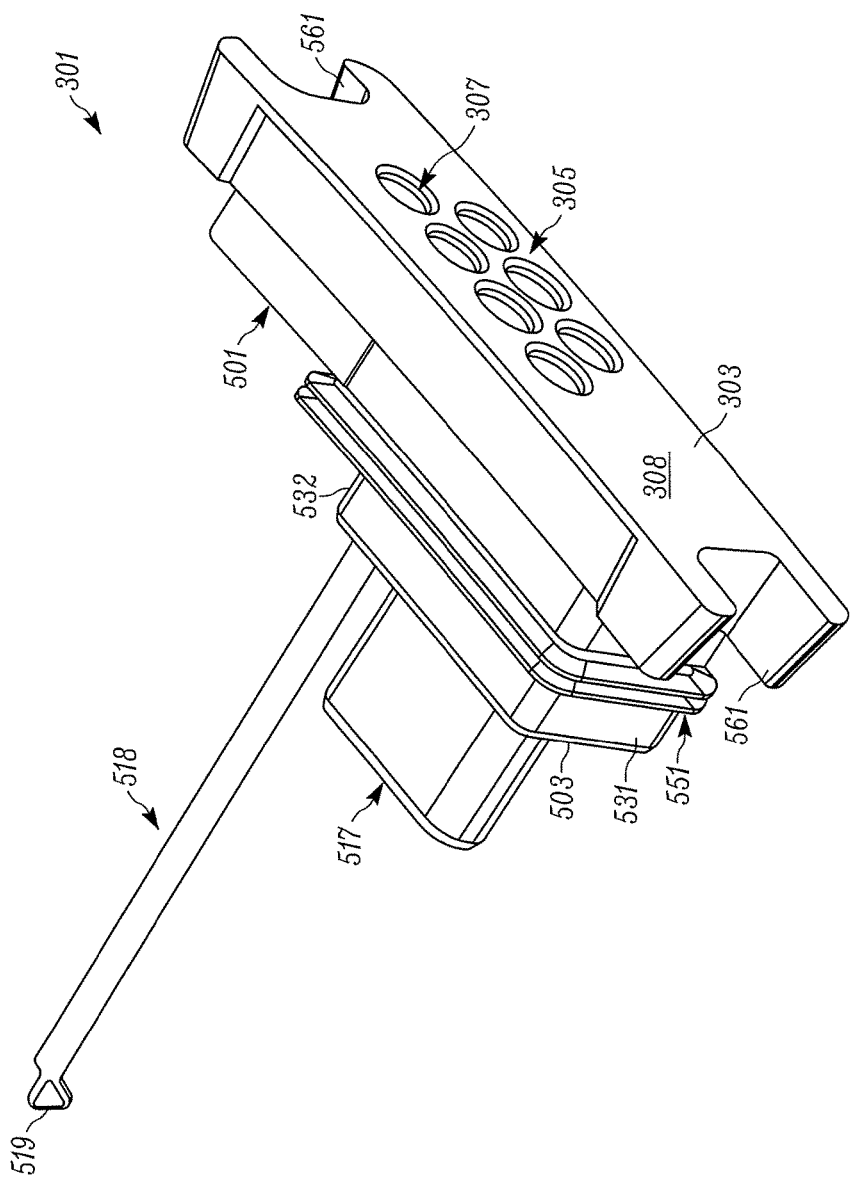
FIG. 5 depicts a perspective view of an adapting the functionality of a device.
Figure 6:
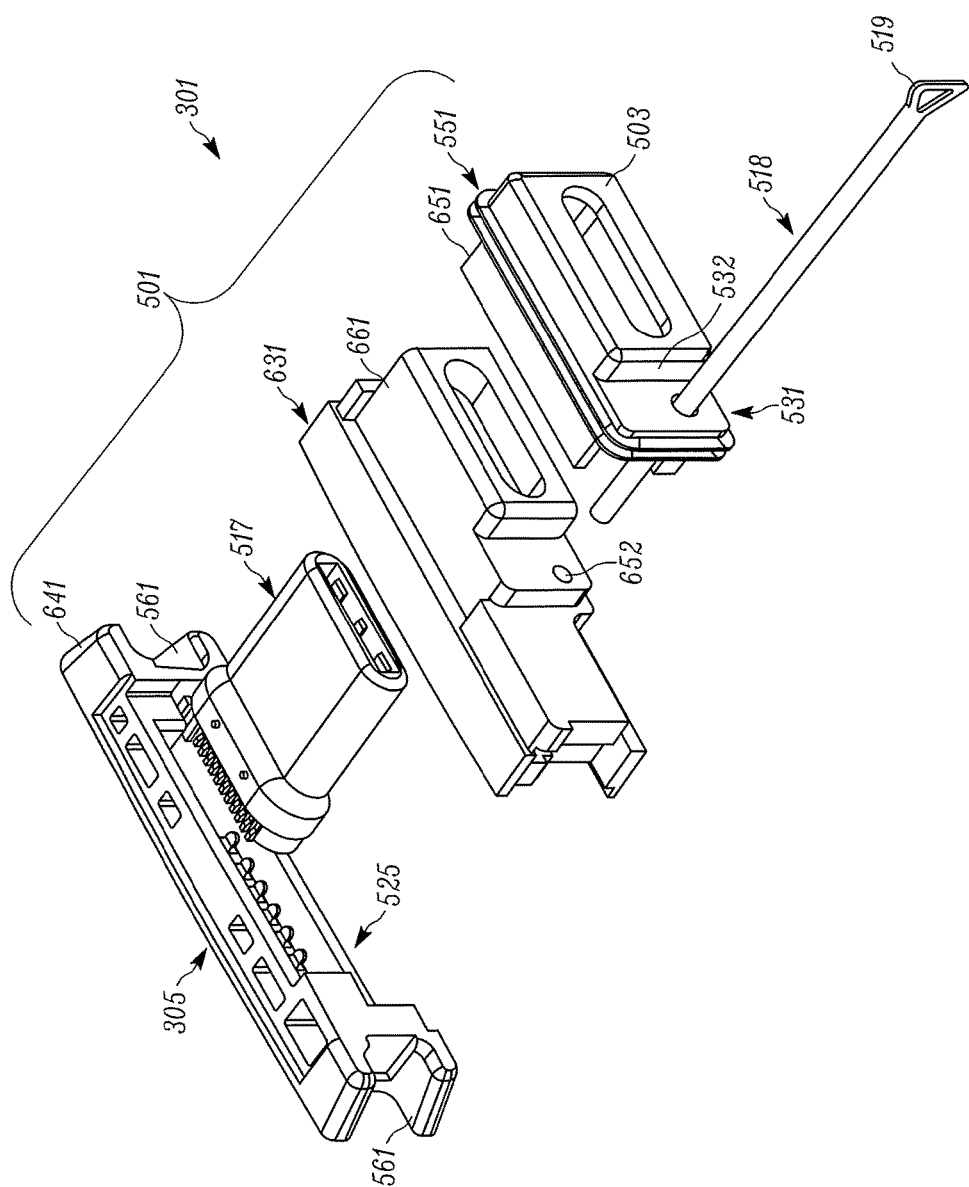
FIG. 6 depicts the adapter of FIG. 5, in a disassembled state.

Attention is next directed to FIG. 5 and FIG. 6 which respectively depict a perspective view of the adapter 301 and a disassembled rear view of the adapter 301.

Adapter 301 comprises: a plug 501 including the outer surface 303 and an inner surface 503, the inner surface 503 opposite the outer surface 303; the surface mount connection port 305 located at the outer surface 303; a male connector 517 extending from the inner surface 503; and, one or more electrical connections 525 (as best seen in FIG. 6) between the male connector 517 and the surface mount connection port 305, the plug 501 configured to mate with the socket 113 of the device 100, and the male connector 517 configured to mate with the respective female connection port 117 of the device 100 located within the socket 113, the outer surface 303 of the plug being flush with the respective outer surface 111 of the device 100 when the plug 501 is mated with the socket 113.

As depicted, the adapter 301 further comprises a tether 518 extending from the inner surface 503, adjacent the male connector 517. The tether 518 is generally configured for removeable attachment to the aperture 124. For example, as depicted, the tether 518 is generally one or more of pliable and/or flexible, and the like, and an end 519 of the tether 518, opposite the inner surface 503, comprises a knob, a ball, a lump, and the like, which is insertable through the aperture 124 using force. As the end 519 is inserted through the aperture 124, the end 119 deforms to pass through the aperture 124, and regains its shape to hold the tether 518 in the aperture 124. Hence the tether 518 tethers the adapter 301 to the device 100, for example when the adapter 301 is removed from the socket 113, as described below with respect to FIG. 11.

As depicted, the plug 501 includes a sealing portion 531 around the male connector 517, the sealing portion 531 configured to mate with the cavity 121 located around the respective female connection port 117 of the device 100, as well as the recess 122. Hence, the sealing portion 531 includes a step 532 that defines a larger portion configured to mate with the recess 122, and a smaller portion configured to mate with the cavity 121.

As depicted, the sealing portion 531 includes one or more soft and/or flexible ribs 551 that extend around one or more side walls of the larger portion of the sealing portion 531. When the adapter 301 is mated with the socket 113, the ribs 551, seal against respective one or more sidewalls 125 of the socket 113, including, but not limited to one or more sidewalls of the recess 122.

As depicted, the adapter 301 includes one or more cutouts 561 configured to receive guideposts, and the like, of an accessory being mated with the surface mount connection port 305, including, but not limited to, a surface mount charging station, to align the one or more contact pads 307 with respective pins of the surface mount charging station, described in more detail below with respect to FIG. 7.

With reference to FIG. 6, the plug 501 includes the sealing portion 531, which can include a soft rubber seal element, and a hard rubber encasement 631, and the like, the soft rubber seal element configured to seal the male connector 517 against the hard rubber encasement 631, for example when the adapter 301 is mated with the socket 113. Indeed, when the adapter 301 is mated with the socket 113, the soft rubber seal element seals against both the hard rubber encasement 631 and, respective one or more sidewalls 125 of the socket 113, including, but not limited to one or more sidewalls of the cavity 121 and the recess 122, in addition to the sealing provide by the ribs 551 against respective sidewalls of the recess 122.

Indeed, such sealing can assist with keeping moisture, and the like, out of the socket 113 and/or the female connection port 117, when the adapter 301 is mated with the device 100.

With further reference to FIG. 6, in depicted implementations, each of the sealing portion 531 the hard rubber encasement 631 include a respective aperture through which the male connector 517 is received during assembly, the male connector 517 generally connected to the surface mount connection port 305 which, as depicted, is housed by a respective hard-plastic encasement 641 which also houses the one or more electrical connections 525. The one or more electrical connections 525 generally connect one or more electrical connectors at the male connector 517 to respective one or more surface contact pads 307 at the surface mount connection port 305. In some implementations, the one or more electrical connections 525 includes a printed circuit board (PCB) housed in the respective hard-plastic encasement 641. In general, the male connector 517 can be supported, prior to assembly by one or more of the hard-plastic encasement 641 and the PCB of the one or more electrical connections 525.

Hence, when assembling the adapter 301, the aperture of the hard rubber encasement 631 slips over the male connector 517, and mates with hard-plastic casement 641, thereby encasing the one or more electrical connections 525. Such mating occurs using fastening devices, such as snaps and the like, and/or using glues, epoxies, and the like. The aperture of the sealing portion 531 slips over the male connector 317, and butts against the hard rubber encasement 631, and is held in place frictionally using tabs 651 of the sealing portion 531 that extend over respective slots 661 of the hard rubber encasement 631. The sealing portion 531 generally includes at least a portion of the inner surface 503 of the adapter 301 such that, when the adapter 301 is assembled, with reference to FIG. 5, the male connector 517 extends from the inner surface 503.

The inner surface 503 is generally defined by the shape of each of the sealing portion 531, the hard rubber encasement 631, and the hard-plastic encasement 641 that face in a same direction as the male connector 517.

However, other implementations of the adapter 301 are within the scope of the present specification. For example, in other implementations, the adapter 301 is assembled from other types of encasements and/or sealing elements made from other types of materials. For example, the sealing portion 531 has been described with respect to a soft rubber sealing element, however in other implementations, the sealing portion 531 comprises other types of materials, including, but not limited to, silicone, and the like. Indeed, the sealing portion 531 generally comprises any suitable material that is deformable and/or pliable and/or flexible and which is used to form a seal against the hard rubber encasement 631 and the inner surface 115 of the socket 113 when the adapter 301 is mated therewith.

Similarly, the hard rubber encasement 631, and the hard-plastic encasement 641 have been described with respect to rubber and plastic, respectively, however in other implementations, the hard rubber encasement 631, and/or the hard-plastic encasement 641 comprises other types of materials, including, but not limited to, rubber, plastic, metal, and the like. Indeed, the hard rubber encasement 631, and/or the hard-plastic encasement 641 generally comprises any suitable material that the hard rubber encasement 631, and/or the hard-plastic encasement 641 that maintains a shape when pressure is applied when adapter 301 is inserted into the socket 113, in order to apply and/or convey pressure to the sealing portion 531 to form a seal, and further maintains a shape when the pressure is applied to the one or more contact pads 307 by respective pins of a charging station.

As depicted in FIG. 6, the tether 518 is disassembled from the adapter 301, however, during assembly, an end of the tether 518 (e.g. opposite the end 519) is fixed into a hole 652, and the like, using epoxy and the like, and further threaded through a complementary hole in the sealing portion 531 (as depicted).

As depicted, the male connector 517 includes one or more of a universal serial bus USB connector and a USB-C connector. In other implementations, the male connector 517 includes a LIGHTNING™ connector. Indeed, the male connector 517 comprises any male connector configured to mate with a complementary female connecting port and, in particular, the female connection port of 117 of the device 100.

Figure 7:
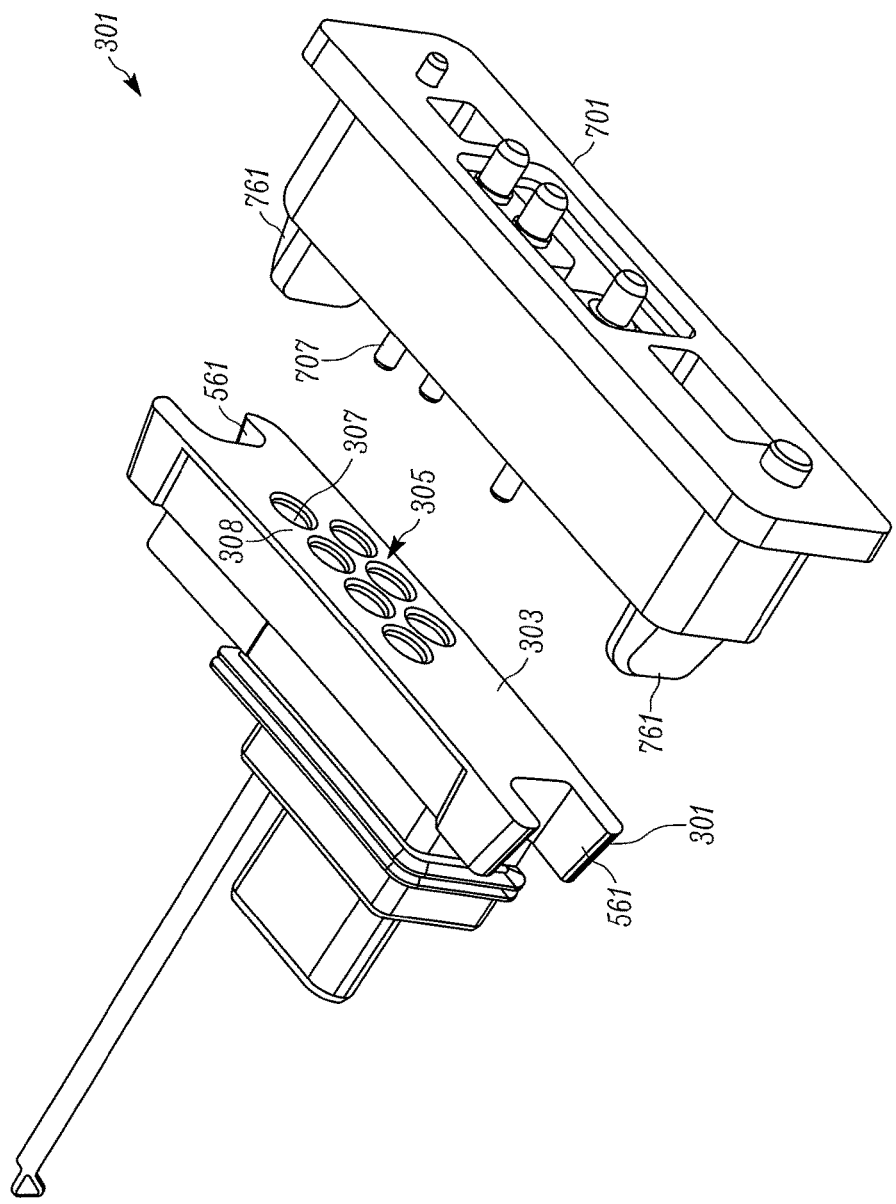
FIG. 7 depicts the adapter of FIG. 5 being mated with a connector of an enterprise-grade charging accessory.

With reference to FIG. 7, which depicts the adapter 301 being mated with a respective connector 701 of a surface mount charging station, the surface mount connection port 305 includes a POGO contact pad, and one or more contact pads 307 comprise POGO electrodes configured to mate with respective POGO pins 707 of the respective connector 701. Furthermore, the respective cutouts 561 are positioned to receive respective guideposts 761 of the respective connector 701 in order to align the one or more contact pads 307 with the respective pins 707. As such, locations of each of the one or more contact pads 307 and the one or more pins 707 are complementary to one another.

Furthermore, as depicted adapter 301 includes five POGO electrodes, the respective connector 701 comprises only three POGO pins 707. The three POGO pins 707 are located to contact respective POGO electrode of the one or more contact pads 307, which are electrically connected to respective electrical contacts of the male connector 317; the respective electrical contacts of the male connector 317 are located to electrically connect with respective electrical contacts of the female connection port 117; and the respective electrical contacts of the female connection port 117 which electrically connect with a charging circuit of the device 100. Assuming that power is being supplied to the three POGO pins 707, when the device 100, with the adapter 301 mated therewith, is mated with the three POGO pins 707, a battery of the device 100 is charged.

However, it is emphasized that the adapter 301 need not be used solely for charging the device 100. For example, the connector 701 and the adapter 301 can alternatively be used for data communication with the device 100 and more than three pins 707 can be provided for such data communication. In other words, data Attention is next directed to FIG. 8 and FIG. 9, each of which schematically depict a cross-section of each of the socket 113 of the device 100, and the adapter 301, with elements of FIG. 8 and FIG. 9 having the same numbering as FIG. 1 to FIG. 7. Not all details of the socket 113 and the adapter 301 are depicted in FIG. 8 and FIG. 9 but are nonetheless assumed to be present. Neither are FIG. 8 and FIG. 9 to scale. Rather, FIG. 8 and FIG. 9 depict respective complementary shapes of the respective inner surfaces 115, 503 of the socket 113 and the adapter 301, respectively, with FIG. 8 depicting the adapter 301 being inserted into the socket 113, as represented by arrow 801, and FIG. 9 depicting the adapter 301 mated with the socket 113.

Figure 9:
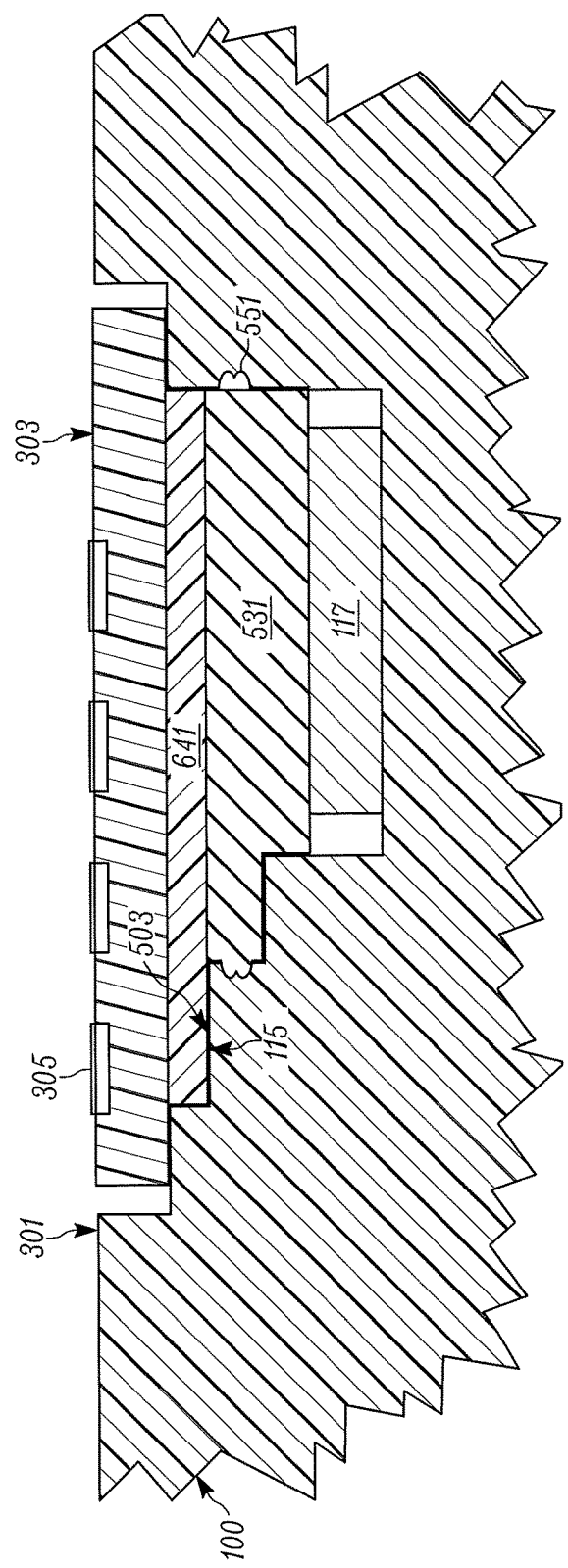
FIG. 9 depicts a schematic cross-section of the adapter of FIG. 5 mated with a socket of a device.

In particular, as clearly seen in FIG. 9, when the adapter 301 is mated with the socket 113, the inner surface 503 of the adapter 301 mates with the inner surface 115 of the socket 113, with the sealing portion 531 sealing against the hard rubber encasement 631, and the like, and against complementary surfaces of the socket 113, for example of the cavity 121 and the recess 122. In particular, the ribs 551 of the sealing portion 531, seal against complementary sidewalls of the socket 113 (e.g. of the recess 122). In addition, the portion of the hard rubber encasement 631 that extends outward from the sealing portion 531 butts up against and/or mates with slot 123.

In addition, the male connector 317 of the adapter 301 mates with the female connection port 117 of the socket 113 such that a charging circuit and/or a processor and/or other components of the device 100 that are in communication with the female connection port 117 are electrically accessible to external accessory using the one or more contact pads 307 of the surface mount connection port 305.

Furthermore, while specific shapes of each of the inner surface 503 of the adapter 301 mates with the inner surface 115 of the socket 113 are depicted, in other implementations, the inner surface 503 of the adapter 301 mates with the inner surface 115 of the socket 113 have other shapes. However, in general, the inner surface 503 of the adapter 301 mates with the inner surface 115 of the socket 113 are complementary to one another.

Figure 8:
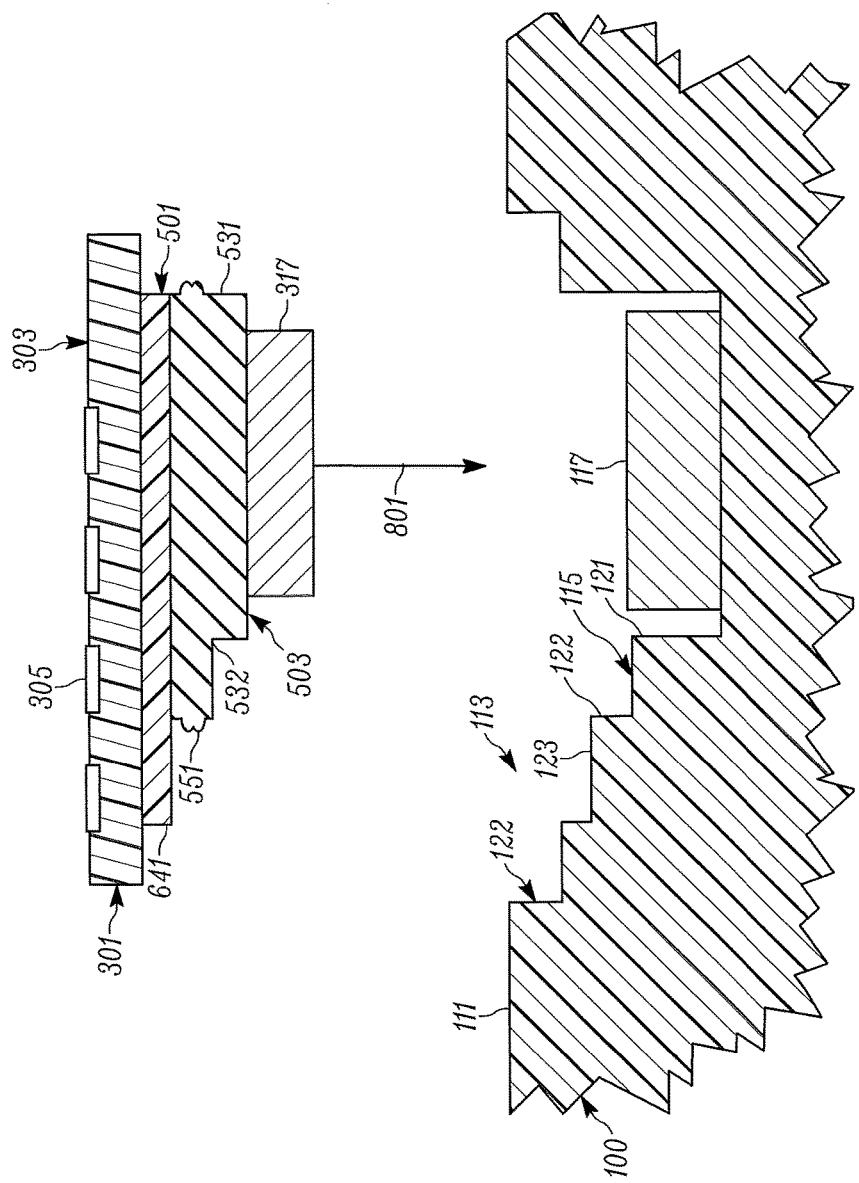
FIG. 8 depicts a schematic cross-section of the adapter of FIG. 5 being mated with a socket of a device.
Figure 10:
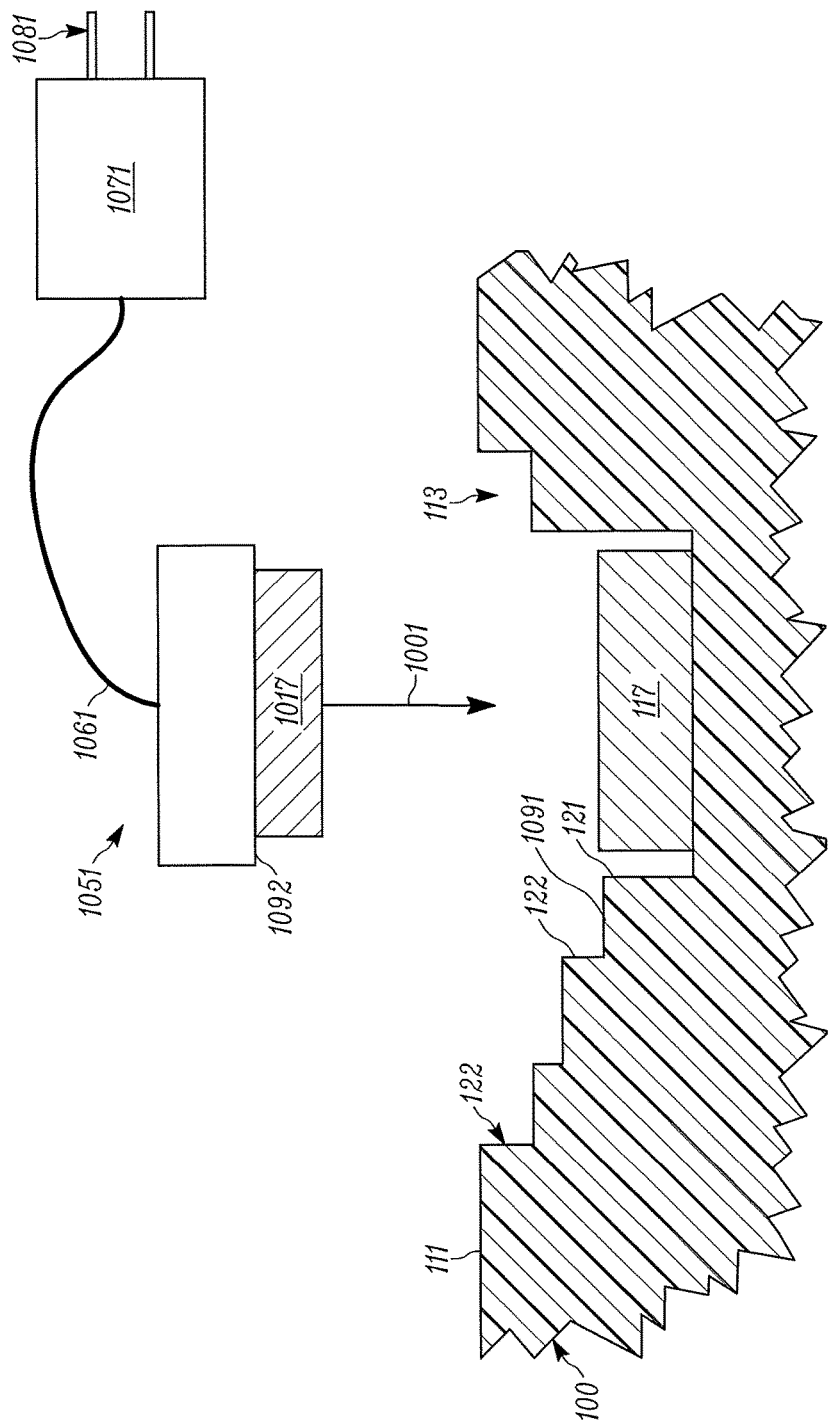
FIG. 10 depicts a schematic cross-section of the adapter of FIG. 5 being mated with a consumer-grade charging accessory.

Attention is next directed to FIG. 10, which is substantially similar to FIG. 8, with like elements having like numbers, however in FIG. 10, the adapter 301 is removed, and the female connection port 117 is being mated (as indicated by arrow 1001) with a complementary male connector 1017 (similar to the male connector 317) of a charging accessory 1051 that includes the male connector 1017 extending from a housing 1059 that connects a cable 1061 to the male connector 1017 to convey power thereto from an AC-to-DC adapter 1071 that includes a plug 1081 that connects with a mains power supply. The recess 122 can be of a size and shape that mates with at least a portion of the housing 1059, and/or an outward facing surface 1091 of the recess 122 can be configured to butt up against a complementary inward facing surface 1092 of the housing 1059 when the male connector 1017 is mated with the female connection port 117.

In general, the charging accessory 1051 comprises a consumer-grade charging accessory including, but not limited to, a USB adapted AC-to-DC charging accessory.

Hence, in FIG. 9, the device 100 is adapted for use with a surface mount charging station, and is hence suitable for use in enterprise environments while, in FIG. 10, the device 100 is adapted for use with a consumer-grade charging accessory and hence is adapted for use in a consumer environment.

Figure 11:
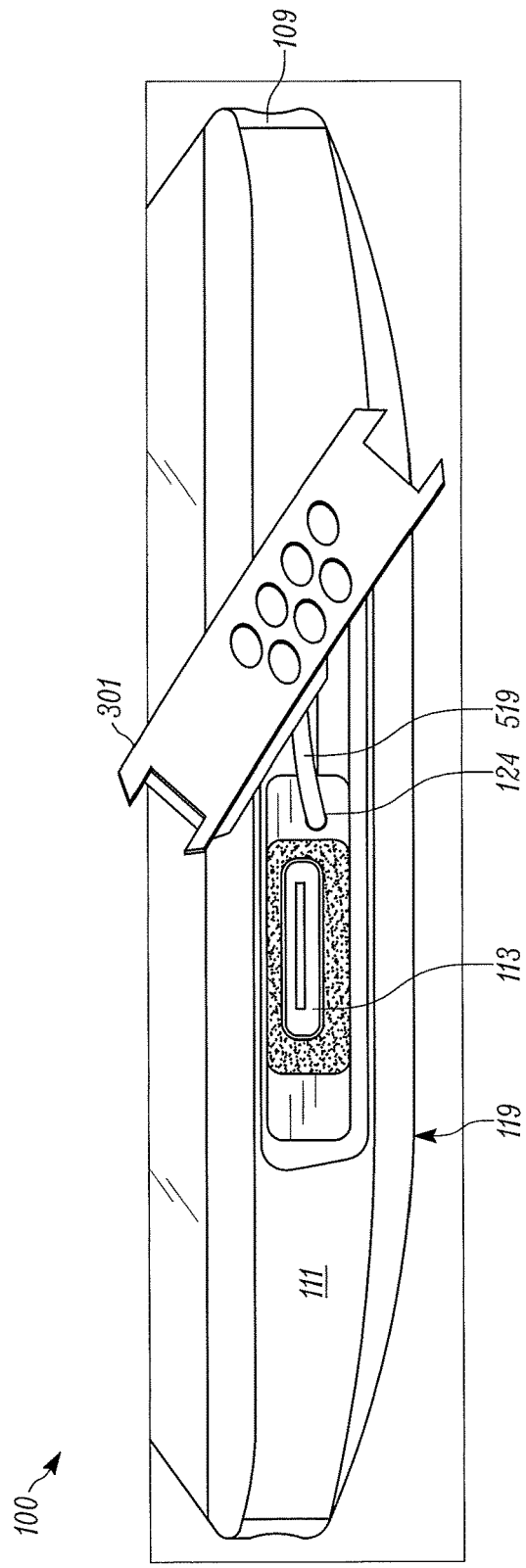
FIG. 11 depicts an end view of the device of FIG. 1, with an adapter tethered thereto.

Attention is next directed to FIG. 11 which depicts the end 119 of the housing 109 of the device 100 with the adapter 301 removed from the socket 113, and with the adapter 301 tethered to the device 100 using the tether 518 connected to the aperture 124. Hence, for example, when the adapter 301 is removed from the socket 113, for example to use the device 100 with the charging accessory 1051, the adapter 301 remains tethered to the device 100.

In some implementations, the adapter 301 is removable from the socket 113 using a tool, for example a small screwdriver, and the like, insertable between the adapter 301 and one or more sidewalls 125 and/or in one or more cutouts 561 to pry the adapter 301 out the socket 113. In other implementations, a tool specially adapted for removing the adapter 301 from the socket 113 is used. In yet further implementations, the adapter 301 is removable from the socket 113 using fingers of a user's hand, and the like.

Figure 12:
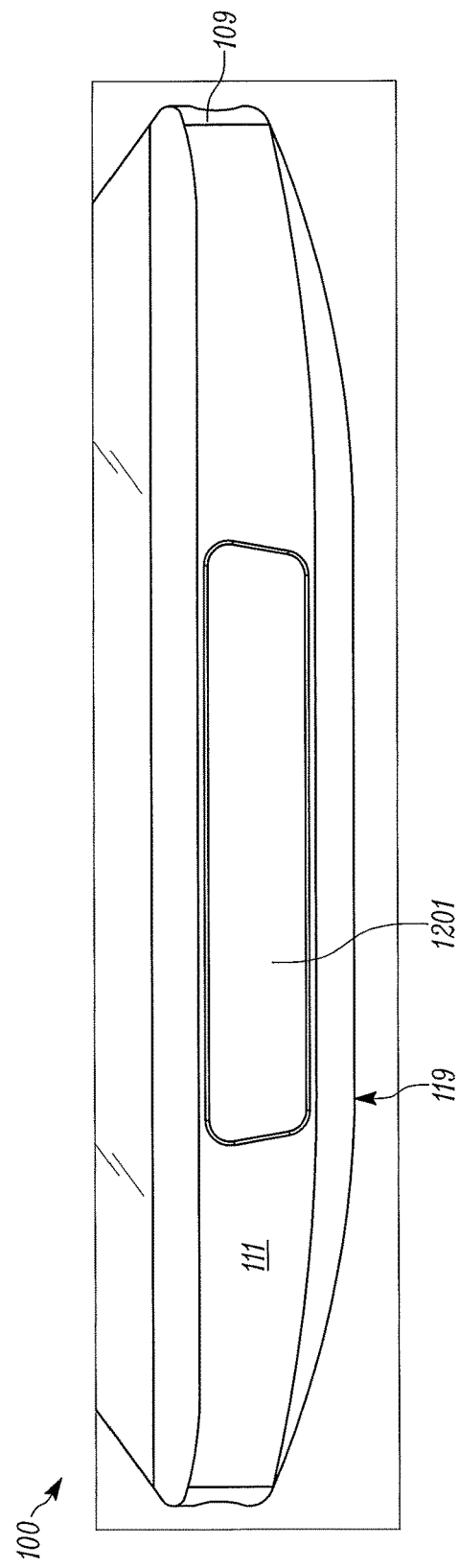
FIG. 12 depicts an end view of the device of FIG. 1, with a cover mated to the socket.
Figure 13:
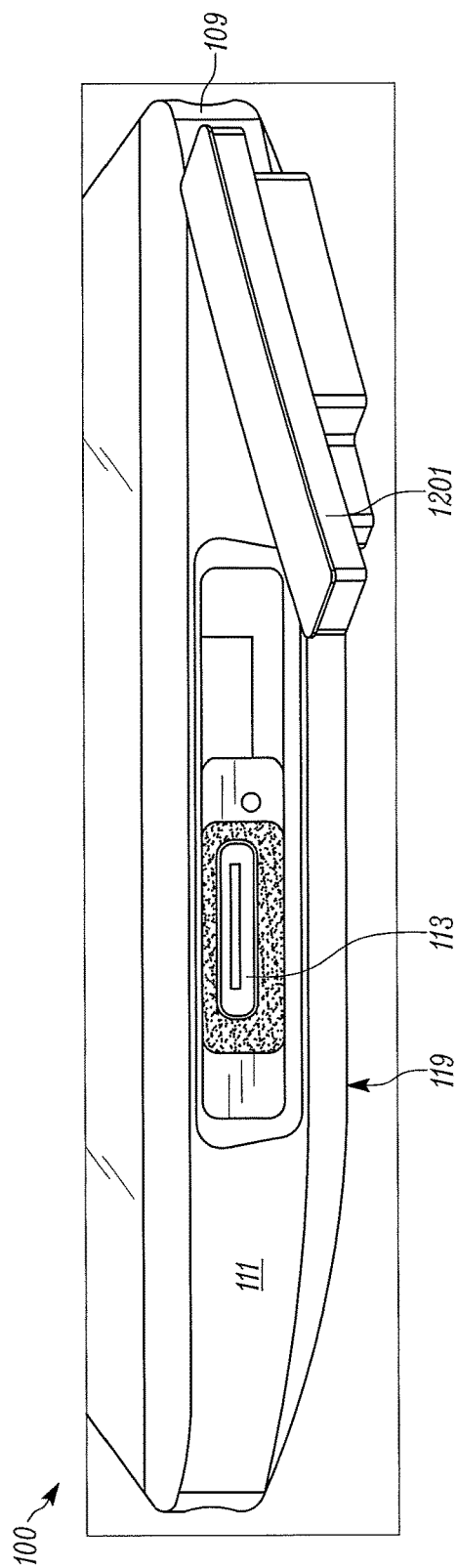
FIG. 13 depicts an end view of the device of FIG. 1, with the cover of FIG. 12 removed.

Attention is next directed to FIG. 12 and FIG. 13, each of which depict the end 119 of the housing 109 of the device 100. However, in FIG. 12, the socket 113 is mated with a cover 1201 that seals the socket 113 and the female connection port 117, and in FIG. 13 the cover 1201 is removed and placed beside the device 100. As seen in FIG. 13, the shape of the cover 1201 is generally similar to that of the adapter 301, however the cover 1201 is generally lacking electrical components and does not include a male connector or surface mount connectors. Rather, the cover 1201 seals the socket 113 and the female connection port 117 against moisture; as such the cover 1201 comprises a pliable and/or flexible material, at least at an internal surface. In some implementations, the cover 1201 has a unitary construction from a single material.

Other types of adapters useable with the socket 113 are within the scope of present implementations. For example, one type of adapter has a shape similar to the adapter 301 with a male connector, but includes radio components for expanding the wireless functionality of the device 100, including, but not limited to, adapting the device 100 for use with proprietary enterprise-type wireless devices.

Other types of adapters are within the scope of present implementations. For example, the socket 113 can be mated with a charging adapter with similar functionality as the charging accessory 1051, but having a size and shape similar to the adapter 301 with, however, the AC-to-DC adapter housed therein, and with a plug extending from an outer surface, the plug optionally being foldable into the adapter.

Alternatively, the socket 113 can be mated with an adapter that converts the female connection port 117 to another type of female connection port, the adapter having a size and shape similar to the adapter 301, but including a LIGHTNING™ connection port at an external surface electrically connected to a USB connector at an internal surface that mates with a USB female connection port of the device 100 (e.g. assuming that the female connection port 117 comprises a USB female connection port). Hence, such an adapter converts a device having a recessed USB female connection port for use with a LIGHTNING™ connector. Alternatively, the socket 113 can be mated with an adapter that converts a LIGHTNING™ connection port of a device for use with a USB connection port (e.g. assuming that the female connection port 117 comprises a LIGHTNING™ connection port).

Furthermore, while the adapter 301, and other types of adapters, have been described with the outer surface 303 being flush with the outer surface 111 of the housing 109. However, in other implementations, the outer surface 303 extends outward from the adapter 301 and/or the housing 109, or the outer surface 303 extends inward from the adapter 301 and/or the housing 109 to adapt and/or convert a shape of the housing 109 for use with a complementary surface of an external accessory.

In some implementations, the adapter 301 can alternatively be referred to as a connector, which provides a ruggedized interface that includes a POGO contact pad for mating with POGO pins on a charging and/or data exchange accessory, such as connector 701 and/or a cradle and/or a charging cradle. As described herein, the adapter 301 includes a contact pad (e.g. surface mount connection port 305) that can include a connector cover 308 having a first plurality of cutouts above a contact pad (e.g. that correspond to the one or more contact pads 307) and a second plurality of cutouts 561 at respective edges of the contact pad. The adapter 301 provides a ruggedized surface connector to female connection port adapter (e.g. a POGO to USB-C interface adapter that uses USB-C protocol compliant circuitry disposed inside the device 100), where the connector cover 308 (e.g. an outer surface 303 of the adapter 301) is shaped to interface with an external accessory and/or a cradle for charging and/or data communication. For temporary removal, the tether 518 is used to keep the adapter 301 tethered to a device, while the female connection port 117 is exposed.

Furthermore, together, the socket 113 and the female connection port 117 together forms a connector assembly. In particular, with reference to FIGS. 2 and 8, such a connector assembly comprises: the socket 113 in the outer surface 111 of the housing 109, the socket 113 including the inner surface 115 inset from the outer surface 111; and, the female connection port 117 located at the inner surface 115 of the socket 113, the socket 113 and the female connection port 117 configured to receive the adapter comprising a plug that converts the female connection port 117 to a surface mount connection port, a respective outer surface of the plug being flush with the outer surface 111 of the housing 109 when the plug is mated with the socket 113. In some implementations, the adapter that converts the female connection port 117 to a surface mount connection port comprises the adapter 301.

In some implementations, the connector assembly is removable from the device 100, such that when the device 100 is assembled, the connector assembly is assembled in the device 100 as a component of the device 100. In such implementations, the device 100 includes an aperture and electrical connections to receive the connector assembly; furthermore, the outer surface 111 of the housing 109 that forms part of the connector assembly is flush with the remaining portion of the housing 109 of the device 100 when the connector assembly is assembled into the device 100. Hence, in these implementations, the connector assembly is manufacturable as a separate component of the device 100, such that different connector assemblies are useable with the device 100, depending on which type of female connection port 117 is to be used with the device 100.

In the foregoing specification, specific implementations have been described. However, one of ordinary skill in the art appreciates that various modifications and changes may be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one of . . . " and "one or more of . . . " language.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. An adapter comprising:
   a plug including an outer surface and an inner surface, the inner surface opposite the outer surface;
   a surface mount connection port located at the outer surface;
   a male connector extending from the inner surface; and,
   one or more electrical connections between the male connector and the surface mount connection port, the plug configured to mate with a socket of a device, and the male connector configured to mate with a respective female connection port of the device located within the socket, the outer surface of the plug being flush with a respective outer surface of the device when the plug is mated with the socket, wherein the plug includes a sealing portion around the male connector, the sealing portion having a step configured to mate with a cavity located in the socket of the device.

2. The adapter of claim 1, wherein the cavity is located around the respective female connection port of the device.

3. The adapter of claim 1, wherein the plug includes a soft rubber seal element and a hard rubber encasement, the soft rubber seal element configured to seal the male connector against the hard rubber encasement.

4. The adapter of claim 1, further comprising a tether extending from the inner surface, adjacent the male connector.

5. The adapter of claim 1, wherein the male connector includes one or more of a universal serial bus (USB) connector, a USB-C connector, and a LIGHTNING connector.

6. The adapter of claim 1, wherein the surface mount connection port includes a POGO contact pad.

7. The adapter of claim 1, wherein the surface mount connection port includes: a POGO contact pad; and a connector cover having a first plurality of cutouts above the POGO contact pad.

8. The adapter of claim 1, wherein the surface mount connection port comprises one or more cutouts configured to receive one or more guideposts of an external accessory when mating the surface mount connection port with the external accessory.

9. The adapter of claim 1, wherein the one or more electrical connections include a printed circuit board located in the plug.

10. A device comprising:
    a housing including an outer surface;
    a socket disposed in the outer surface of the housing, the socket including an inner surface inset from the outer surface; and,
    a female connection port located at the inner surface of the socket,
    the socket and the female connection port configured to receive an adapter that comprises a plug, configured to mate with the socket, the adapter further comprising a male connector, configured to mate with the female connection port, the socket configured to receive a respective inner surface of the plug against the inner surface of the socket, wherein the socket further includes a cavity, located around the female connection port, the cavity configured to mate with a step in a sealing portion of the adapter.

11. The device of claim 10, wherein the adapter converts the female connection port to a surface mount connection port, a respective outer surface of the adapter being flush with the outer surface of the housing when the adapter is mated with the socket.

12. The device of claim 10, wherein the socket further includes an aperture configured to removably receive a tether attached to the adapter.

13. The device of claim 10, wherein the female connection port includes one of a universal serial bus port and a LIGHTNING port.

14. The device of claim 10, wherein the socket is further configured to mate with a cover that seals the socket and the female connection port.

15. The device of claim 10, wherein the socket includes one or more sidewalls extending between the outer surface of the housing and the inner surface of the socket.

16. A connector assembly comprising:
- a socket disposed in an outer surface of a housing, the socket including an inner surface inset from the outer surface of the housing; and
- a female connection port located at the inner surface of the socket, the socket and the female connection port configured to receive an adapter comprising a plug that converts the female connection port to a surface mount connection port, a respective outer surface of the plug being flush with the outer surface of the housing when the plug is mated with the socket,
- wherein the socket further includes a cavity, located around the female connection port, the cavity configured to mate with a step in a sealing portion of the adapter.

17. The connector assembly of claim 16, wherein the adapter further comprises a male connector configured to mate with the female connection port, the socket configured to receive a respective inner surface of the plug against the inner surface of the socket.

18. The connector assembly of claim 17, wherein the plug includes a soft rubber seal element and a hard rubber encasement, the soft rubber seal element configured to seal the male connector against the hard rubber encasement.

19. The connector assembly of claim 16, wherein the socket further includes an aperture configured to removably receive a tether attached to the adapter.

\* \* \* \* \*